United States Patent
Rao et al.

(10) Patent No.: US 8,014,921 B2
(45) Date of Patent: Sep. 6, 2011

(54) ULTRASONIC SENSOR-BASED SIDE IMPACT SENSING SYSTEM

(75) Inventors: Manoharprasad K. Rao, Novi, MI (US); Chris Bujak, New Baltimore, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 656 days.

(21) Appl. No.: 12/145,642

(22) Filed: Jun. 25, 2008

(65) Prior Publication Data

US 2009/0326764 A1 Dec. 31, 2009

(51) Int. Cl.
*G06F 19/00* (2011.01)
(52) U.S. Cl. .......................... 701/45; 280/735; 340/436
(58) Field of Classification Search .................. 701/45; 280/735; 340/436
See application file for complete search history.

(56) References Cited

U.S. PATENT DOCUMENTS

| | | | |
|---|---|---|---|
| 4,694,295 | A | 9/1987 | Miller et al. |
| 6,186,261 | B1 | 2/2001 | Stocker et al. |
| 6,516,258 | B1 | 2/2003 | Herrmann et al. |
| 7,042,344 | B2 * | 5/2006 | Chiba et al. .................... 340/435 |
| 7,046,128 | B2 | 5/2006 | Roberts |
| 7,243,013 | B2 * | 7/2007 | Rao et al. ......................... 701/45 |
| 7,260,461 | B2 | 8/2007 | Rao et al. |
| 7,712,776 | B2 * | 5/2010 | Prakah-Asante et al. ..... 280/735 |
| 7,756,611 | B2 * | 7/2010 | Sugiura ............................. 701/1 |
| 2004/0000992 | A1 * | 1/2004 | Cuddihy et al. ............... 340/436 |
| 2005/0168329 | A1 | 8/2005 | Kuttenberger et al. |
| 2005/0206142 | A1 | 9/2005 | Prakah-Asante et al. |
| 2006/0119473 | A1 * | 6/2006 | Gunderson et al. ........... 340/435 |
| 2007/0100527 | A1 * | 5/2007 | Rao et al. ......................... 701/45 |
| 2010/0228419 | A1 * | 9/2010 | Lee et al. ......................... 701/25 |

* cited by examiner

*Primary Examiner* — Drew Brown
(74) *Attorney, Agent, or Firm* — Franklin Mackenzie; Ford Global Technologies, LLC

(57) ABSTRACT

A side-impact threat assessment system that uses at least one ultrasonic sensor is provided. A method of detecting a potential side-impact collision on a host vehicle is also provided. The method calls for using at least one ultrasonic sensor for presence detection and for providing sensed data used in estimating closing velocity.

9 Claims, 2 Drawing Sheets

ULTRASONIC SENSOR-BASED SIDE IMPACT SENSING SYSTEM

TECHNICAL FIELD

This disclosure relates to pre-crash sensing systems for automotive vehicles, the systems using ultrasonic sensors.

BACKGROUND

Auto manufacturers are investigating radar, lidar and vision-based pre-crash sensing systems to improve occupant safety. Pre-crash sensing systems have been recognized to have the potential of improving occupant safety by deploying the passive restraints devices earlier in a crash, or even before the actual impact. This extra time allows more flexibility for component design and can allow the passive restraints system to be individually tailored to the occupant and crash scenario.

Existing pre-crash sensing systems present challenges that make it difficult to adapt said systems for side-impact applications. Vision and radar systems, for example, can be relatively expensive and difficult to package due to space constraints. Additionally, existing systems for blind-spot detection and lane change assistance present challenges because of the limited field of coverage for the sensors used in those systems. In particular, sensors in those systems are adapted to detect cars and trucks in adjacent lanes toward the rear of the vehicle. Such field of coverage is incomplete for side-impact applications because most side-impact collisions are caused by vehicles coming from side-frontal directions.

Additional challenges exist regarding side-impact sensing systems. In particular, because there are often vehicles traveling in adjacent lanes, it is difficult to avoid false-positive alarms in a side-impact sensing system.

Also, an analysis of the National Automotive Sampling System (NASS) accident database shows that a majority of side-impact collisions occur when a host vehicle is traveling at a speed of less than 40 kilometers per hour. In fact, this NASS database analysis, which includes data from 1995-2007, indicates that 62% of side-impact collisions occur when the host vehicle is traveling at a speed of less than 40 kilometers per hour.

It would therefore be desirable to provide a side-impact sensing system that provides accurate determinations as to the presence of a potential side-impact collision impactor. It would also be desirable to provide a system that is relatively inexpensive and that can be incorporated into existing vehicles and combined with existing systems with relative ease. It would also be desirable to provide a system that is able to detect potential side-impact collisions when the host vehicle is traveling at a speed of less than about 40 kilometers per hour.

SUMMARY

A system and method are provided to address, at least in part, one or more of the needs or desires left unaddressed by prior systems and methods.

In particular, a side-impact threat assessment system for a vehicle is provided. The system includes at least one ultrasonic sensor mounted on each side of the vehicle. Each sensor has a substantially non-overlapping field of coverage with respect to each other sensor. Additionally, each sensor is capable of detecting a presence of an impactor. The system also includes a controller coupled to each ultrasonic sensor, the controller being configured to calculate an estimated closing velocity of the impactor object.

A method of detecting a potential side-impact collision on a host vehicle is provided. The method includes a step of sensing a presence of an impactor object using at least one ultrasonic sensor mounted on a side of the host vehicle. The method also includes a step of calculating an estimated closing velocity using a controller coupled to the ultrasonic sensor(s). Additionally, the method includes a step of determining whether to pre-arm a restraint control module on the vehicle based upon, at least, presence detection and estimated closing velocity.

These and other embodiments will become apparent upon a reading of the application and appended claims, without departing from the scope and spirit of the invention as set forth in the claims.

DETAILED DESCRIPTION

Ultrasonic sensors are widely commercially available, and can be far less expensive than sensors for radar, lidar or vision-based systems. Ultrasonic sensors are known to be robust to a variety of environmental conditions. However, wind noise above a certain threshold can affect the performance of ultrasonic sensors. Later-developed technologies may make ultrasonic sensors more robust in this regard, as can currently-available noise-cancellation techniques. Even accounting for the sensitivity to wind noise in today's ultrasonic sensors, an ultrasonic-based side impact sensing system may be useful in situations when a host vehicle is moving at a speed of less than 50 km/hr or less than 45 km/hr or less than 40 km/hr. It is contemplated that the ultrasonic sensor-based side-impact sensing system disclosed herein may supplement, rather than replace, post-crash sensing systems.

Figure 1:
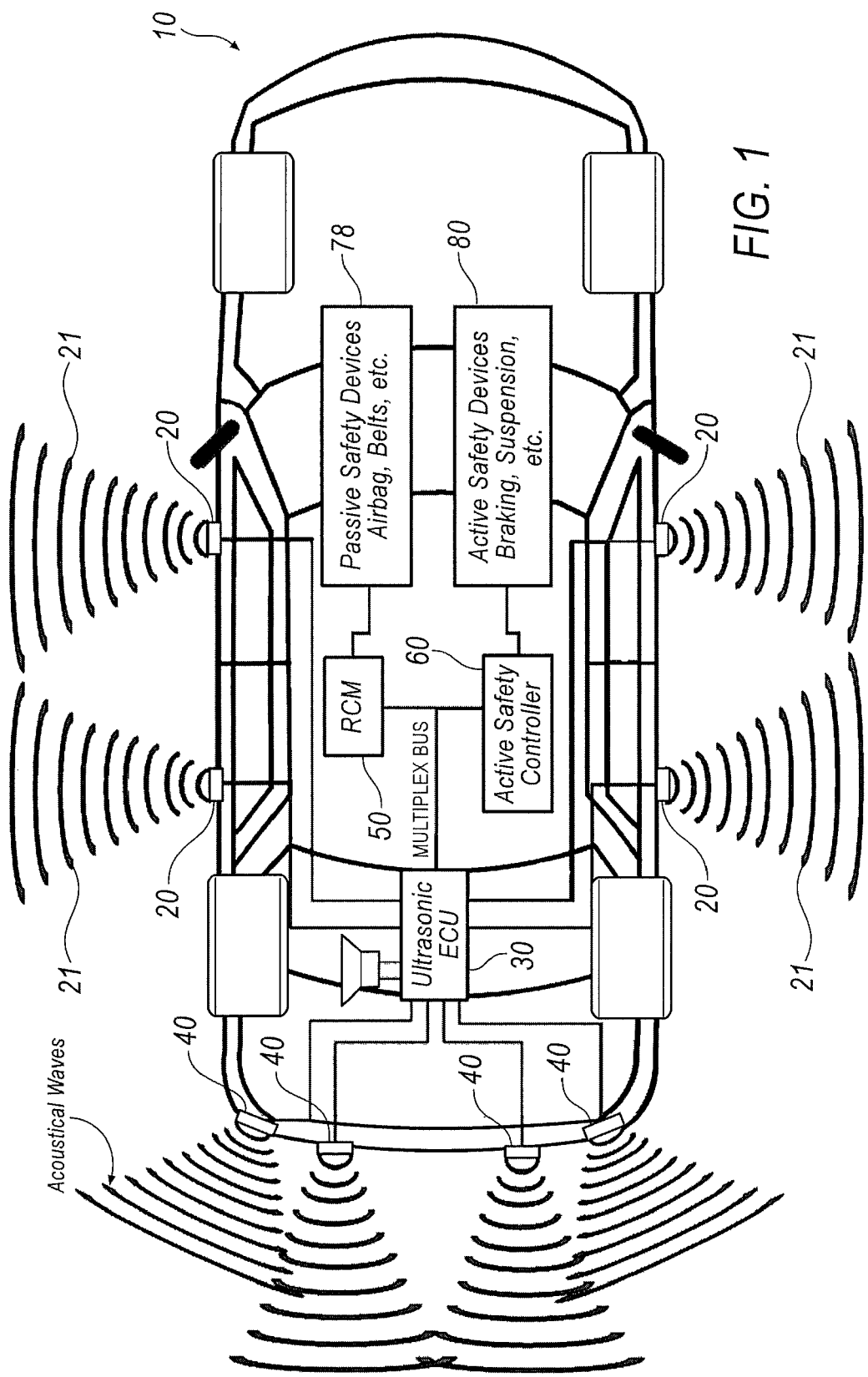
FIG. 1 is an exemplary host vehicle having an exemplary ultrasonic sensor-based side impact sensing system.
Figure 2:
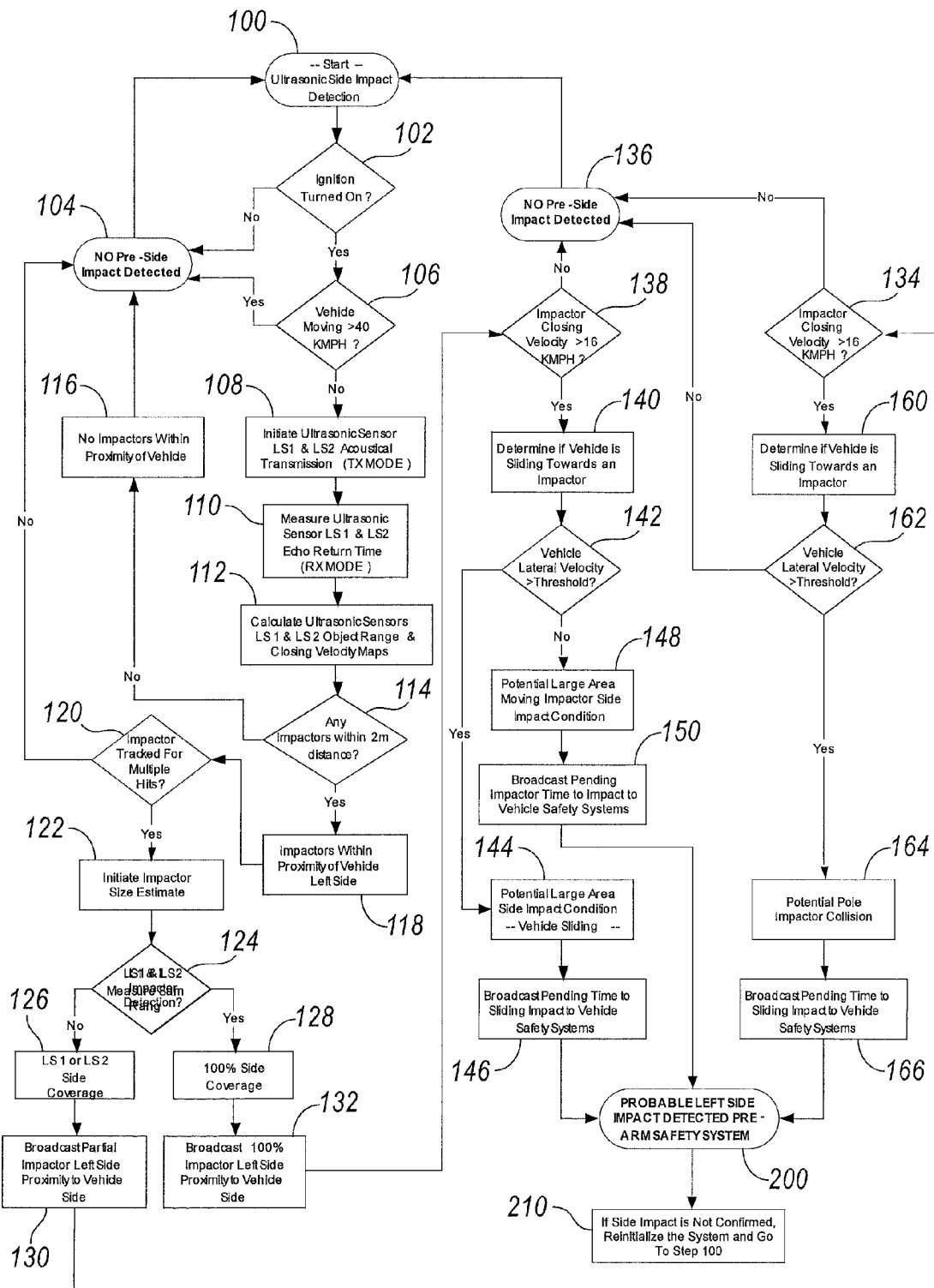
FIG. 2 is exemplary algorithm logic for an ultrasonic sensor-based side impact sensing system.

References to Figures and examples herein are intended to be illustrative and non-limiting. FIG. 1 shows an exemplary system for an ultrasonic sensor-based side-impact sensing system. FIG. 2 shows exemplary logic for use with such a system.

Referring to FIG. 1, host vehicle 10 has four ultrasonic sensors 20 mounted thereon. As depicted, two ultrasonic sensors 20 are positioned on a first side of the host vehicle 10, and two ultrasonic sensors 20 are positioned on a second side of the host vehicle 10. As depicted, one ultrasonic sensor 20 on the first side is mounted on a front door facing outwardly, and one ultrasonic sensor 20 is mounted on a rear door facing outwardly on the first side. Similarly, one ultrasonic sensor 20 is mounted on a front door of the second side, and one ultrasonic sensor is mounted on the rear door of the second side. Alternatively, the ultrasonic sensors 20 can be mounted on any suitable side structures, such as rockers, side pillars and quarter panels, as long as the ultrasonic sensors 20 are adequately separate from one another for the purpose of covering a wide detection area. Ultrasonic sensors 20 may be mounted on the host vehicle 10 using any known mechanical or chemical mounting or attachment device or method.

Each ultrasonic sensor 20 has a sensing range 21 extending from the ultrasonic sensor 20. The sensing ranges 21 can be configured to detect objects up to 5 meters from the ultrasonic sensor 20 or up to 3 meters from the ultrasonic sensor 20, or any other range that an auto manufacturer determines is appropriate for a commercial application. Acoustical waves are depicted on FIG. 1 to demonstrate exemplary ranges 21.

The side-impact ultrasonic sensors 20 are positioned such that a sensing range 21 of one sensor 20 does not overlap or substantially does not overlap a sensing range 21 of another sensor 20. Additionally, the ultrasonic sensors 20 are positioned at a height sufficient to avoid detection of the ground and ground clutter while still being able to sense a bumper of an impactor vehicle.

Referring to FIG. 1, the side-impact ultrasonic sensors 20 are incorporated into an existing ultrasonic system. That is, ultrasonic sensors 20 can use but do not require the use of a separate ultrasonic ECU 30; rather, ultrasonic sensors 20 can be coupled to or otherwise in communication with an existing ultrasonic ECU 30 in the host vehicle 10. For example, a rear back-up aid system that uses ultrasonic sensors 40 can share the ultrasonic ECU 30 with the side-impact ultrasonic sensors 20.

The ultrasonic ECU 30 is coupled to or otherwise in communication with a restraint control module (RCM) 50, which controls the logic to pre-arm and to ultimately deploy passive safety devices 78 such as airbags, safety belts and the like based upon a variety of inputs. As is well known, active safety controller 60 for controlling active safety devices 78 is also in communication with the RCM 50 and the ultrasonic ECU 30.

Ultrasonic sensors 20 can be used to detect many different types of impactor objects that might result in a side-impact collision. Two non-limiting exemplary classes of impactor objects are described herein: vehicles and pole objects. Vehicle objects include cars, trucks, snowmobiles, and other moving objects that could hit a car. Pole objects include immobile objects that are generally significantly less wide than vehicles. Pole objects are typically taller than they are wide. Examples include trees, telephone poles, street signs, columns and pillars.

Many different algorithms could be used in connection with detecting a side-impact involving an impactor vehicle. In one exemplary algorithm where two ultrasonic sensors 20 reside on the same side of host vehicle 10, both ultrasonic sensors 20 must detect the existence of the impactor vehicle. The ultrasonic ECU 30 then uses the sensed data from the ultrasonic sensors 20 to calculate a closing velocity using well-known algorithms. If the closing velocity is over a predetermined threshold, then the ultrasonic ECU 30 can communicate with the RCM 50 so that the RCM 50 can make quicker decisions regarding whether to deploy airbags and the like. This is because the RCM 50 may make restraint system deployment decisions based on pre-crash sensing and the accelerometer and/or pressure sensors mounted on or near the vehicle sides for post-crash sensing without waiting for confirmation from a remote RCM accelerometer sensor implemented on a post-crash side collision sensing system. This can reduce the amount of time necessary for an RCM to make side-impact deploy decisions, which take 6-10 milliseconds without an ultrasonic sensor-based side-impact system, to about 2-3 milliseconds with such a system. In other words, the response time can be reduced by about 3 milliseconds to about 8 milliseconds.

Optionally, the algorithm can be programmed so that no pre-armament decision is made by the RCM 50 via the ultrasonic sensor-based side impact system when the host vehicle 10 is traveling over a certain speed, such as 40 km/hr. When such logic is included in the RCM 50 and the host vehicle 10 is traveling at a speed over the predetermined threshold, then the pre-existing post-impact collision system will work to deploy side airbags and the like as it would have in the absence of an ultrasonic sensor-based side-impact system.

Many different algorithms could be used in connection with detecting a side-impact involving an impactor pole object. In one exemplary algorithm, only one ultrasonic sensor 20 is required to sense the pole object. This is because of the thinner nature of the pole object as compared to a vehicle. The sensed data may then be used by the ECU 30 to calculate a closing velocity using well known algorithms. Closing velocities in pole impact situations are generally lower than closing velocities in vehicle impact systems, and thus allow greater time for ultrasonic signal analysis. The host vehicle 10 often has a lateral velocity if it is sliding toward a pole object. The lateral velocity of the host vehicle 10 may be sensed the vehicle active safety sensing system, which communicates that lateral velocity to the RCM 50. If the closing velocity and the lateral velocity are each over a certain threshold, then the RCM 50 can pre-arm the restraint system and thus make quicker deployment decisions.

Referring to FIG. 2, sample logic is shown for a left-side (LS) ultrasonic side-impact pre-crash sensing system. A similar logic could be used for a right-side (RS) application. Step 100 is the beginning point for ultrasonic side-impact algorithm. Step 102 evaluates whether the ignition is turned on. If not, no side impact is detected, as indicated in step 104. If the ignition is on, step 106 evaluates whether the host vehicle is moving faster than 40 km/hr. If so, no side impact is detected using ultrasonic sensors, as indicated in step 104. In step 108, if the host vehicle is moving slower than 40 km/hr, then ultrasonic sensor LS1 and ultrasonic sensor LS2 are initiated to emit acoustical waves. In step 110, echo return time is measured from the ultrasonic sensors. In step 112, an object range and closing velocities are calculated and mapped. If there are any impactor objects within 2 m, as considered in step 114, then a decision is reached in step 118 that there are impactor objects within a designated proximity of the left side of the host vehicle. If there are not objects within 2 m, then a decision is reached in step 116 that there no objects within the designated proximity of the left side of the host vehicle, and no pre-crash side impact condition is detected, as indicated in step 104.

If step 118 identifies an impactor, and step 120 determines that the impactor is tracked for multiple hits, then step 122 initiates an impactor size estimation process. In step 124, it is determined whether both ultrasonic sensors LS1 and LS2 detect the impactor object. If not, then "pole-based" impactor logic is followed in step 126. If so, then "vehicle-based" impactor logic is followed in step 128.

Following the pole-based logic, in step 126, it is determined which of the ultrasonic sensors detects the impactor object, then in step 130, a broadcast is made according to which of the sensors detected the impactor object. In step 134, it is determined whether the closing velocity between the host vehicle and the impactor object is greater than 16 km/hr. If not, then no pre-crash side impact condition is detected, as indicated in step 136. If so, then step 160 initiates the process for determining whether there is lateral movement of the host vehicle toward an impactor object by monitoring the host vehicle lateral velocity from the vehicle active safety sensing system. If so, then in step 162, it is determined whether the host vehicle is traveling over a predetermined threshold for lateral velocity. If not, then no pre-crash side impact condition is detected, as indicated in step 136. If the lateral velocity threshold is crossed, then in step 164, a potential collision with a pole impactor is detected and broadcast in step 166. In step 200 it is determined that a probable pole object side impact is detected, and the RCM pre-arms the restraint system or systems accordingly. If the predicted side impact is not confirmed within a predetermined time with the post impact sensors, then in step 210, the system is re-initialized and the control is transferred to step 100 to restart the side impact sensing process.

Following the vehicle-based logic, after both ultrasonic sensors detect an impactor vehicle, step 128 calls for full coverage of the side of the host vehicle, and a broadcast reflecting same is made in step 132. Next, in step 138, the impactor closing velocity is measured. If the impactor closing velocity is under 16 km/hr, no pre-crash side impact condition is detected, as indicated in step 136. If the closing velocity is over 16 km/hr, then step 140 initiates a process for determining whether the host vehicle is sliding toward the impactor object by monitoring the host vehicle lateral velocity by using the vehicle active safety sensing system. If so, step 142 requires a determination of whether the host vehicle is traveling in a lateral direction with a lateral velocity over a predetermined threshold. If so, step 144 calls for a preparation for a large area side impact condition with sliding and step 146 makes the associated broadcast. After the broadcast, step 200 causes the RCM to pre-arm the appropriate system or systems. If the predicted side impact is not confirmed within a predetermined time with the post impact sensors, then in step 210, the system is re-initialized and the control is transferred to step 100 to restart the side impact sensing process.

If the host vehicle is not traveling in a lateral direction with a lateral velocity over a predetermined threshold, then step 148 calls for a preparation for a large area side impact condition with a moving impactor and step 150 makes the associated broadcast. After the broadcast, step 200 causes the RCM to pre-arm the appropriate system or systems. If the predicted side impact is not confirmed within a predetermined time with the post-impact crash sensors, then in step 210, the system is re-initialized and the control is transferred to step 100 to restart the side impact sensing process.

The particular thresholds and logic disclosed in FIG. 2 are merely exemplary, and subject to the design choices of a particular auto manufacturer for a particular application. FIG. 2 is not intended to be limiting.

While at least one embodiment of the appended claims has been described in the specification, those skilled in the art recognize that the words used are words of description, and not words of limitation. Many variations and modifications are possible without departing from the scope and spirit of the invention as set forth in the appended claims.

We claim:

1. A side-impact threat assessment system, comprising:
   (a) a plurality of ultrasonic sensors on a common side of a host vehicle, each sensor having a substantially non-overlapping field of coverage with respect to each other sensor and each sensor being capable of detecting a presence of an impactor object; and
   (b) a controller coupled to the ultrasonic sensors, the controller being configured to distinguish between vehicle impactor objects and pole impactor objects based upon, at least, data sensed from the ultrasonic sensors, each type of impactor object having independent predetermined closing velocity thresholds, the controller further being configured to calculate an estimated closing velocity for comparison to the predetermined threshold for closing velocity specific to the type of impactor object.

2. The system of claim 1 wherein the controller identifies the type of impactor object as a pole impactor object if, at least, the sensed data reflects that only one ultrasonic sensor on a common side of the host vehicle indicates the presence of an impactor object.

3. The system of claim 1 wherein the controller identifies the type of impactor object as a vehicle impactor object if, at least, the data sensed from at least two sensors on a common side of the host vehicle indicates the presence of an impactor object.

4. The system of claim 1 wherein the predetermined closing velocity threshold for a pole impactor object is lower than the predetermined closing velocity threshold for a vehicle impactor object.

5. The system of claim 1 wherein each ultrasonic sensor is configured to detect the presence of the impactor object when the impactor object is up to about 5 m away from the detecting sensor.

6. The system of claim 1, the system being in communication with a restraint control module that controls a restraint system.

7. The system of claim 6 adapted to pre-arm the restraint system using the restraint control module the estimated closing velocity is higher than the predetermined threshold for the closing velocity for the type of impactor object and the host vehicle is traveling at a speed of less than about 40 km/hr.

8. The system of claim 7 wherein the side impact protection system comprises an airbag.

9. A method of detecting a potential side-impact collision from a host vehicle, comprising:
   (a) sensing a presence of an impactor object using at least one of a plurality of ultrasonic sensors mounted on a common side of the host vehicle;
   (b) determining whether the sensed impactor object is a pole impactor object or a vehicle impactor object using a controller coupled to the ultrasonic sensors, each impactor object type having its own predetermined threshold for closing velocity;
   (c) calculating an estimated closing velocity using the controller; and
   (d) determining whether to pre-arm a restraint system using the restraint control module of the host vehicle based upon at least whether the estimated closing velocity exceeds the predetermined threshold for closing velocity for the type of impactor object.

* * * * *